US010654447B2

(12) United States Patent
Oesterling et al.

(10) Patent No.: US 10,654,447 B2
(45) Date of Patent: May 19, 2020

(54) VEHICLE SHARING ACCESSORY MODULE AND SYSTEM

(71) Applicant: GENERAL MOTORS LLC, Detroit, MI (US)

(72) Inventors: Christopher L. Oesterling, Troy, MI (US); Robert Miles, Austin, TX (US); Hrushit B. Raval, Clinton Township, MI (US); Paul H. Pebbles, Novi, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 313 days.

(21) Appl. No.: 15/718,652

(22) Filed: Sep. 28, 2017

(65) Prior Publication Data

US 2019/0092280 A1    Mar. 28, 2019

(51) Int. Cl.
*H04M 1/66* (2006.01)
*B60R 25/24* (2013.01)
(Continued)

(52) U.S. Cl.
CPC .......... *B60R 25/241* (2013.01); *B60R 25/01* (2013.01); *B60R 25/209* (2013.01); *G06F 21/305* (2013.01); *G06F 21/34* (2013.01); *G06F 21/604* (2013.01); *G06F 21/86* (2013.01); *G06Q 10/02* (2013.01); *H04L 63/0428* (2013.01); *H04L 63/061* (2013.01); *H04L 63/108* (2013.01);
(Continued)

(58) Field of Classification Search
CPC .... G06F 7/00; G06F 17/00; G06F 2221/0771; G07C 9/00309; G07C 2009/00769; G07C 2009/00547; G07C 2009/00341; G07C 9/00174; B60R 25/24; B60R 2325/103; B60R 2325/205; B06R 25/24; G06Q 10/02; G01S 19/13; H04L 9/32; H04W 12/04; H04W 12/06; H04W 12/08; H04W 4/00; H04W 4/12; H04W 84/18; H04W 88/02
USPC .............................................. 455/411; 701/2
See application file for complete search history.

(56) References Cited

U.S. PATENT DOCUMENTS 8,798,809 B2 *   8/2014   Kalhous ............. G07C 9/00309
                                                              701/2
9,110,772 B2 *   8/2015   Huntzicker ............. G06F 17/00
(Continued)

FOREIGN PATENT DOCUMENTS

WO   WO-2017058925 A1 *   4/2017   ........... H04L 5/0032

*Primary Examiner* — Mahendra R Patel

(57) ABSTRACT

A system for authorizing temporary access and operation of a vehicle via a mobile computing device, the system includes a processor and a memory device. The system also includes a SRWC module configured to communicate with the mobile computing device; and a CNG module being in communication with the SRWC module, the CNG module includes a NAD, configured to communicate with one or more remote entities over a wireless carrier system; a GPS module, configured to generate vehicle position information and communicate that position data to the one or more remote entities; a CGM, configured to monitor and control incoming communications from the SRWC module, NAD, and GPS module. The CGM further configured to establish communications across a CAN; and a CMS, configured to encrypt the communications established by CGM as well as store the communications in the memory device.

17 Claims, 9 Drawing Sheets

(51) Int. Cl.
*G06F 21/30* (2013.01)
*G06F 21/34* (2013.01)
*G06F 21/60* (2013.01)
*H04L 29/06* (2006.01)
*H04W 12/04* (2009.01)
*H04W 4/80* (2018.01)
*B60R 25/01* (2013.01)
*B60R 25/20* (2013.01)
*G06F 21/86* (2013.01)
*G06Q 10/02* (2012.01)
*H04W 12/02* (2009.01)
*H04W 12/06* (2009.01)
*H04W 12/08* (2009.01)
*G01S 19/13* (2010.01)

(52) U.S. Cl.
CPC ............ *H04W 4/80* (2018.02); *H04W 12/02* (2013.01); *H04W 12/04* (2013.01); *H04W 12/06* (2013.01); *H04W 12/08* (2013.01); *G01S 19/13* (2013.01)

(56) References Cited

U.S. PATENT DOCUMENTS

| | | | |
|---|---|---|---|
| 9,807,547 B1* | 10/2017 | Oesterling | G06Q 30/02 |
| 2010/0159846 A1* | 6/2010 | Witkowski | G07C 9/00857 |
| | | | 455/70 |
| 2010/0222939 A1* | 9/2010 | Namburu | B60R 16/037 |
| | | | 701/2 |
| 2011/0112969 A1* | 5/2011 | Zaid | G06Q 10/02 |
| | | | 705/50 |
| 2012/0221473 A1* | 8/2012 | Redmann | H04L 9/3247 |
| | | | 705/50 |
| 2013/0099892 A1* | 4/2013 | Tucker | G07C 9/00309 |
| | | | 340/5.61 |
| 2013/0317693 A1* | 11/2013 | Jefferies | G07B 15/00 |
| | | | 701/31.5 |
| 2015/0341766 A1* | 11/2015 | Nelson | H04W 4/025 |
| | | | 455/404.2 |
| 2015/0356797 A1* | 12/2015 | McBride | G07C 9/29 |
| | | | 340/5.61 |
| 2016/0098876 A1* | 4/2016 | Oz | G06Q 50/265 |
| | | | 340/5.61 |
| 2016/0142416 A1* | 5/2016 | Smith | H04L 63/08 |
| | | | 726/9 |
| 2017/0093536 A1* | 3/2017 | Yoganathan | H04W 4/48 |
| 2017/0174178 A1* | 6/2017 | Nixon | B60R 25/04 |
| 2017/0178035 A1* | 6/2017 | Grimm | H04L 67/12 |
| 2018/0061155 A1* | 3/2018 | Ghorpade | G07C 9/00571 |
| 2018/0204399 A1* | 7/2018 | Newman | H04L 67/306 |
| 2018/0351946 A1* | 12/2018 | Forest | H04L 63/0861 |
| 2018/0374126 A1* | 12/2018 | Patil | H04W 4/40 |
| 2019/0066424 A1* | 2/2019 | Hassani | B60R 25/23 |

\* cited by examiner

VEHICLE SHARING ACCESSORY MODULE AND SYSTEM

INTRODUCTION

Renting a vehicle typically requires that a reservation is made with a rental company and that the user travels to the site of the rental company to obtain keys to access to the vehicle as well as enabling vehicle operations. Modern vehicles typically offer remote keyless systems (e.g., keyfobs that can wirelessly perform vehicle functions and utilize physical keys that are inserted into an ignition switch to start the vehicle) or passive entry/start systems (i.e., push-button start), where the keyfob can authorize starting functions as long as it is detected inside the vehicle. With such systems, the assigned user is unknown until the user checks in at the on-site rental facility, selects the vehicle, and is issued keys. Typically, going to the rental site may be time consuming due to traveling to a location not within close proximity to the user and then working with the rental agency to obtain their key and/or key fob. As follows, rental vehicles used for vehicle sharing operations are parked at a centralized facility and secured until the user obtains the fob or paperwork to utilize the vehicle even after a vehicle reservation has been made. These rental companies do not additionally have capability to trace the vehicle location, remotely disable the vehicle in the case of theft, and remotely monitor key vehicle diagnostics stats.

In summary, for rental vehicle sharing operations, the objective of the system disclosed herein is to provide users both authorization and access to utilize the vehicle and remotely track/monitor/control the vehicle through this accessory module. Thus, the user will not need to go to the rental agency site and receive approval from one or more company personnel before leaving with the vehicle. The system and method discussed herein are thus designed to simplify vehicle sharing operations to the customer's advantage.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of authorizing temporary access and operation of a vehicle via a mobile computing device, the method includes: generating a reservation request to reserve the vehicle via the mobile computing device; communicating the reservation request to a remote entity; in response to a successful reservation request, via the remote entity, transmitting an authentication key to the mobile computing device over a wireless carrier system, where an accessory module is used to perform vehicle access and vehicle operations of the vehicle, and where the authentication key enable the mobile computing device and the accessory module to be paired for vehicle access and operations; executing an authorization between the mobile computing device and the accessory module; and enabling access to vehicle operations in response to a successful authorization. Other embodiments of this aspect include corresponding computer systems, apparatus, and computer programs recorded on one or more computer storage devices, each configured to perform the actions of the methods.

Implementations may include one or more of the following features. The method where the accessory module includes a sub-module, known as CNG module, (where CNG acronym is from all 4 components included in the module): a network access device (NAD), GPS module, cybersecurity gateway module (CGM), and cryptographic module with Secure Storage (CMS). The method where the accessory module is enabled to perform vehicle access and vehicle operations through the steps of: providing communications between the CNG module and a passive entry/passive start (PEPS) module; requesting cryptography keys from a remote entity, via the NAD, for validation between the CNG module and the peps module. The method may also include validating the cryptography keys via the CGM. A method where generating the reservation request to reserve the vehicle via the mobile computing device further includes the steps of: communicating the reservation request to a remote entity by the mobile computing device, generating a signed token by the remote entity, transmitting the signed access token to the NAD of the accessory module within a predetermined time from the reservation request. The method further includes the step of sending a confirmation to the mobile computing device. The method where the step of executing an authorization between the mobile computing device and the accessory module further includes the steps of: receiving, by the mobile computing device, a broadcast short range wireless communications signal transmitted by a communication module of the accessory module; pairing the mobile computing device and the communication module; validating the mobile computing device to the accessory module utilizing an authorization key validation technique. The method where the communication module utilizes a Bluetooth low energy (BLE) protocol. The method where receiving, by the mobile computing device, the broadcast signal transmitted by the communication module further includes the steps of: monitoring the communication bus for one or more communications over a predetermined period of time: transmitting a wake-up call to the CNG module in response to the one or more communications on the communication bus during the predetermined period of time; otherwise entering sleep mode. The method where enabling access to the vehicle and vehicle operations in response to a successful authorization further includes the steps of: actuating a command on the mobile computing device relating to a vehicle operation; transmitting the command from the mobile computing device to a communication module over a short-range wireless communication protocol; receiving the command by the communication module and communicating the command to the accessory module; transmitting, by the accessory module, the command to the passive entry/passive start system; actuating the selected vehicle function in response to receiving the command. The method further includes the steps of: detecting at least one of an end of trip selection by the user or a timed out period; transmitting, by the accessory module, a door lock command to the passive entry/passive start system; actuating a vehicle door lock operation; and deleting the authorization key from a memory of the accessory module. The method where the step of transmitting the command to the peps module includes: transmitting, by the accessory module, a wake-up call to the passive entry/passive start system; and transmitting the command to the passive entry/passive start system. The method where enabling access to the vehicle and vehicle operations in response to a successful authorization further includes the steps of: detecting the mobile computing device within an interior of the vehicle, via the communication module, in response to actuating the vehicle function; supplying power to the accessory module, where the accessory module stores at least one authorization key for enabling vehicle start functions; detecting an actuation of a switch for ignition activation within the vehicle; and enabling an engine start operation of the vehicle. Implementations of the described techniques may include hardware, a method or process, or computer software on a computer-accessible medium.

One general aspect includes a system for authorizing temporary access and operation of a vehicle via a mobile computing device, the system includes: a processor and a memory device. The system also includes a communication module configured to communicate with the mobile computing device over one or more SRWC protocols; and a CNG module being controlled by the processor and in communication with the communications module, the CNG module including: a network access device (NAD) configured to communicate with one or more remote entities over a wireless carrier system; a GPS module configured to generate vehicle position information, the GPS module configured to collaborate with the NAD to communicate the position data to the one or more remote entities; a cybersecurity gateway module (CGM) configured to monitor and control incoming communications from the SRWC module, NAD, and GPS module, the CGM further configured to establish communications across a controller area network (CAN); and a cryptographic module with secure storage (CMS) configured to encrypt the communications established by CGM as well as store the communications in the memory device. Other embodiments of this aspect include corresponding computer systems, apparatus, and computer programs recorded on one or more computer storage devices, each configured to perform the actions of the methods.

Implementations may include one or more of the following features. The system further includes an external interface module (EIM) configured to communicate with one or more external vehicle systems. The system where the system is coupled to an antenna system, the antenna system configured to enable the system to communicate with one or more remote computing devices. The system where the antenna system includes: one or more cellular antennas configured to transmit and receive long distance data communications over a wireless carrier system; one or more SRWC antennas configured to transmit and receive data communications over a SRWC protocol; one or more GPS antennas configured to transmit and receive data communications with a global navigation satellite system (GNSS). The system where the communication module utilizes a Bluetooth low energy (BLE) protocol. The system where the CGM is configured to record all communication attempts from the NAD and SRWC module as read-only messages that are stored onto the memory device. The system is packaged in a tamperproof and potted enclosure being secured within a vehicle. Implementations of the described techniques may include hardware, a method or process, or computer software on a computer-accessible medium.

One general aspect includes an accessory module for assisting in authenticating a mobile computing device to a fleet vehicle of a vehicle sharing system so as to enable fleet vehicle access and operations without requiring a vehicle key or key fob, the accessory module being packaged in a tamperproof and potted enclosure secured within a vehicle, the accessory module being coupled to an antenna system, the accessory module including: a processor and a memory device. The accessory module also includes a communication module configured to communicate with the mobile computing device through a Bluetooth low energy (BLE) protocol. The accessory module also includes an external interface module (EIM) configured to communicate with one or more external vehicle systems; a CNG module being controlled by the processor and in communication with the communication module, the CNG module including: a network access device (NAD) configured to communicate with one or more remote entities over a wireless carrier system; a GPS module configured to generate vehicle position information, the GPS module configured to collaborate with the NAD to communicate the position data to the one or more remote entities; a cybersecurity gateway module (CGM) configured to monitor and control incoming communications from the communication module, NAD, and GPS module, the CGM further configured to establish communications across a controller area network (CAN), the CGM further configured to record all communication attempts from the NAD and communication module as read-only messages that are stored onto the memory device; a cryptographic module (CMS) configured to encrypt the communications established by CGM as well as store the communications in the memory device; and where the antenna system configured to enable the system to communicate with one or more remote computing devices, the antenna system includes: one or more cellular antennas configured to transmit and receive long distance data communications over a wireless carrier system; one or more SRWC antennas configured to transmit and receive data communications over a SRWC protocol; one or more GPS antennas configured to transmit and receive data communications with a global navigation satellite system (GNSS). Other embodiments of this aspect include corresponding computer systems, apparatus, and computer programs recorded on one or more computer storage devices, each configured to perform the actions of the methods.

The above features and advantages of the present teachings are readily apparent from the following detailed description when taken in connection with the accompanying drawings.

DETAILED DESCRIPTION

Embodiments of the present disclosure are described in this document. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those skilled artisans will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
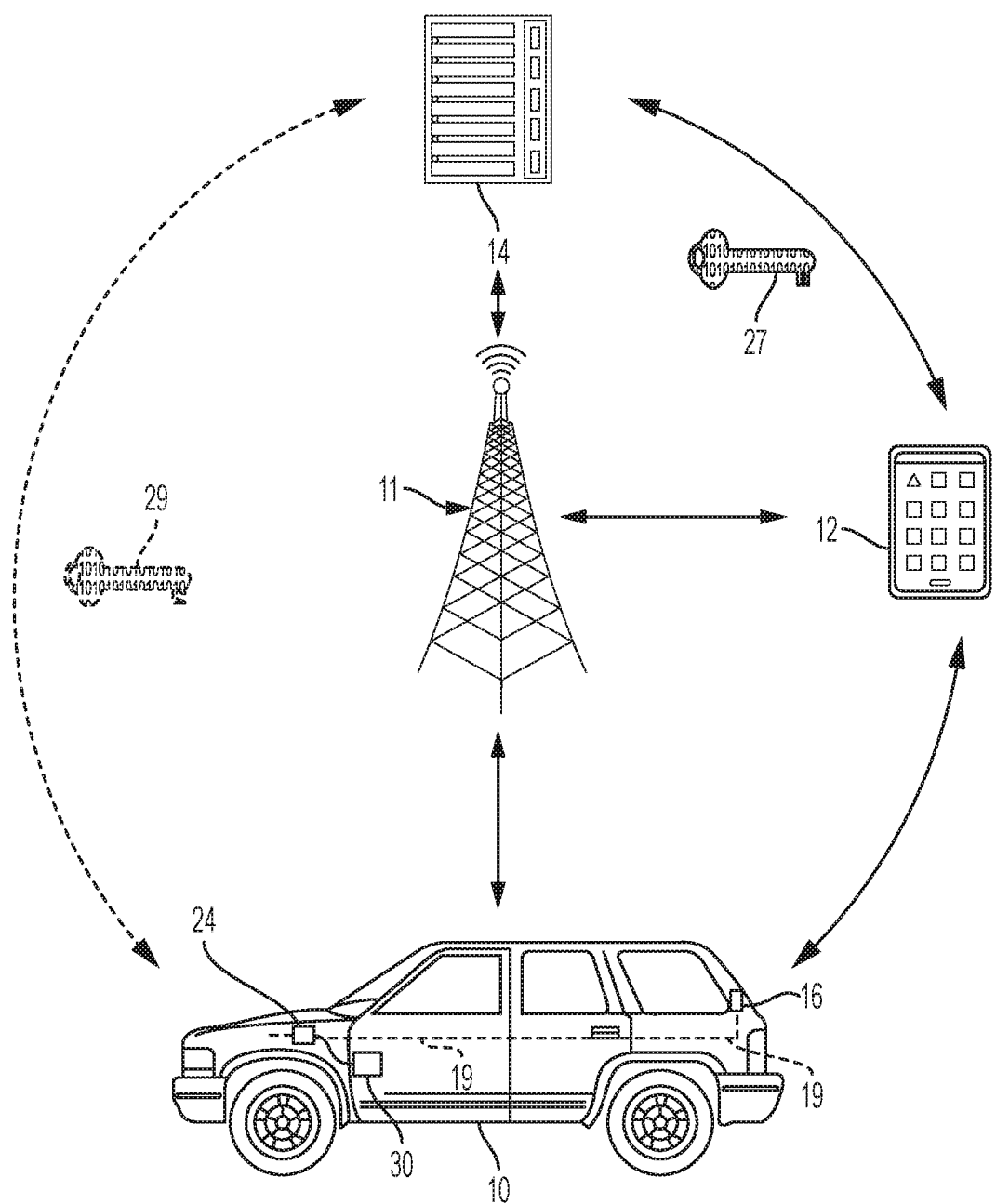
FIG. 1 illustrates a communication flow diagram between communicating entities for a vehicle sharing system.
Figure 2:
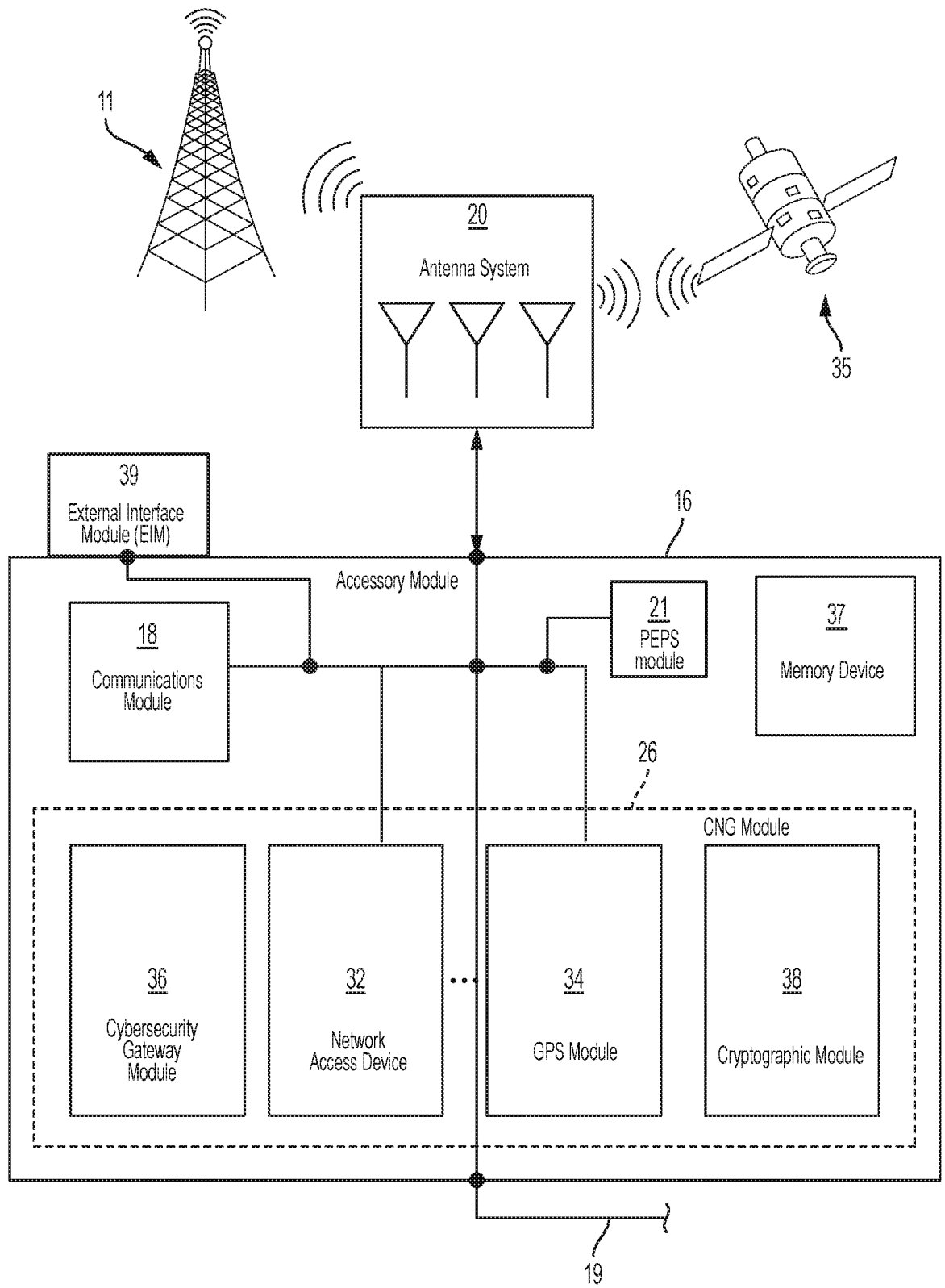
FIG. 2 is a block diagram of an assembly module system according to an embodiment.

FIGS. 1 and 2 illustrate a communication flow diagram between communicating entities for a vehicle sharing system. The vehicle sharing system utilizes an adaptive accessory module that assists in authenticating a mobile computing device (such as a smart phone) to a vehicle for enabling vehicle operations. The vehicle sharing system allows a user to reserve a respective vehicle parked by a previous user at a respective location utilizing the mobile computing device. The vehicle sharing system implements Short Range Wireless Communication (SRWC) technology to pair the user's mobile computing device to the accessory module so that vehicle functions (such as, but not limited to, vehicle access and operation) may be performed by the user on the mobile computing device without requiring a vehicle key or corresponding key fob to perform vehicle operations. It should be understood that although an automobile is used herein for exemplary purposes, the embodiments described herein can be applied to other types of systems where shared access is utilized including, but are not limited to, rail systems, planes, off-road sport vehicles, robotic vehicles, motorcycles, farm equipment, and construction equipment.

One aspect of the vehicle system incorporates a vehicle 10, mobile computing device 12 having wireless communications capabilities, accessory module 16, and a remote entity 14. The mobile computing device 12 may be embodied as a smart phone, tablet, or some similar device being capable of communicating with the vehicle 10 and remote entity 14 via accessory module 16 (e.g., through an internal communications module 18 implementing short range wireless communications (SRWC), discussed below). For the illustrative purposes described herein, a smart phone will be used and shown herein, however it should be understood that the embodiments described herein are not limited to a smart phone (for example, they may be a wearable computing device).

An exemplary wireless carrier system 11 is a cellular telephone system which includes a plurality of cell towers (only one shown), one or more cellular network infrastructures (not shown), as well as any other networking components required to connect wireless carrier system 11 with corresponding land network for long-distance communications. As is generally known, each cell tower may also include sending and receiving antennas and a base station. Wireless carrier system 11 can implement any suitable communications technology, including, for example, analog technologies such as AMPS, or the newer digital technologies such as, but not limited to, 3G, 4G LTE, and 5G.

Remote entity 14 may be a server that incorporates a data controller which essentially controls its operations. Remote entity 14 may also incorporate a memory that includes one or more application program interface (API) suites. One API suite can incorporate numerous vehicle-share services records (i.e., vehicle reservation information) each having information related to vehicle 10 such as, but not limited to, vehicle-share vehicle records, information related to a vehicle share system user such as, but not limited to, reservation account records, and information related to organizing vehicle reservations as well as fleet management such as, but not limited to, reservation profile records; or any other pertinent vehicle-share system information. These records could moreover be written in SQL as well as be copied, organized, and/or stored in a tabular form to allow for continuous, real-time updates.

The vehicle 10 is equipped with accessory module 16 that includes wireless communications module 18 (otherwise known as "SRWC module 18"), CNG module 26, PEPS module 21, and is coupled to an antenna system 20 (internal or external to the enclosure/housing of accessory module 16). The accessory module 16 itself incorporates a central processing unit and memory device—both being represented by reference number 37—that can enable accessory module 16 to temporarily function as a vehicle FOB. As follows, accessory module 16 replaces the need for storing an authorization key in one or more designated key fobs.

Accessory module 16 may be an aftermarket device that is plugged into an existing communication port 30 within vehicle 10 (OBD or ALDL) or module 16 may be permanently installed as part of the vehicle's architecture during vehicle manufacture. When permanently installed, accessory module 16 may be directly connected to a vehicle Controller Area Network (CAN) 19 through a single wire (low speed) vehicle bus or dual wire (high speed) vehicle bus. Accessory module 16 may also operate on low current modes to minimize vehicle battery drainage (e.g., entering a low current state when no single wire GMLAN traffic is being sensed within the vehicle CAN bus). It should be understood that the accessory module 16 can be constructed with a plurality of printed circuit boards (PCBs) or can be a single PCB (e.g., CNG module 26 and wireless communications module 20 are located on the same PCB and communicably coupled).

Accessory module 16 may moreover be packaged in a tamperproof and potted enclosure that is secured at some location within the vehicle interior. The accessory module 16 may also be packaged with established security mechanisms that protect against unauthorized usage or theft (e.g., by disabling the remote keyless functionality). Generating the passive commands can now be performed by accessory module 16 upon acquiring the proper digitally encrypted authorization keys, as described below.

Antenna system 20 may include multiple antennas to enable accessory module 16 to communicate with one or more remote computing devices (e.g., remote entity 14 and mobile computing device 12). For example, antenna system 20 may include a cellular antenna 20' that is equipped to transmit and receive long distance data communications over wireless carrier system 11. Antenna system 20 may also include an antenna 20" that is equipped to transmit and receive data communications over a short-range wireless communication (SRWC) protocol such as, but not limited to, Bluetooth Low Energy and WIFI. Antenna system 20 may also include an antenna 20'" that is equipped to receive GPS satellite signals and generating GPS coordinates based on those signals. It should be understood that each antenna of system 20 may be in one location of vehicle 10 or they may be located at different vehicle locations. It should be further understood that system 20 may be installed within the enclosure of accessory module 16.

Wireless communications module 18 includes the ability to communicate with locally remote computing devices (e.g., mobile computing device 12) and pair with these devices through SRWC protocols. The communications module 18 includes an SRWC chipset (e.g., a BLE/WIFI chipset) and may be coupled to the SRWC antenna of antenna system 20. Wireless communications module 18 may be configured to prevent the SRWC broadcast identifier from being changed without a valid authentication. When paired with a mobile computing device 12, communications module 18 may include the ability to prevent other mobile computing devices, within a certain range of assembly module 16 from additionally pairing to other devices.

CNG module 26 includes four primary components: a Network Access Device 32 (NAD), GPS module 34, Cybersecurity Gateway Module 36 (CGM), and Cryptographic Module 38 (CMS). One or more of these components may be hardware based, software based, or they may be based on some combination of hardware and software. When hardware based, each of these components may be coupled together via one or more system buses.

The NAD 32 enables accessory module 18 to conduct long distance data communications with remote entity 14 by implementing data communications over wireless carrier system 11. For example, remote entity 14 may send a remote vehicle disable command to vehicle 10 via NAD 32. Alternatively, vehicle diagnostics information may be transmitted to remote entity 14 via NAD 32. NAD 32 may also enable accessory module 18 to communicate with other wireless-enabled devices (e.g., mobile computing device 12) via wireless carrier system 11. NAD 32 preferably uses radio signals to establish data channels with remote entity 14 (or mobile computing device 12) and provides data via packet transmissions and such transmissions may be in an SMS format. According to one embodiment, NAD 32 allows for cellular communications according to standards such as GSM, UMTS, LTE, or 5G. It should be understood that NAD 32 implements antenna system 20 to send and receive data communications.

GPS module 34 enables accessory module 16 to receive radio signals from a constellation of GPS satellites 35 (shown as one), also known as a Global Navigation Satellite System (GNSS). From these signals, GPS module 34 can determine vehicle position. The position information can then be supplied to remote entity 14, or some other remote computer system, for purposes such as vehicle fleet management. As such, GPS module 34 may communicate with NAD 32 to send the position information to remote entity 14 over a data channel via carrier system 11. It may be understood that the NAD 32 and GPS module 34 may be combined into a single module (i.e., a NAD which supports GPS functionality).

The CGM 36 acts as a cybersecurity device that establishes a software firewall which monitors and controls the incoming data communications received by antenna system 20 and outgoing data communications created by CNG module 26. As such, CGM 36 attempts to cease malicious data transmissions from being received by any other system within vehicle 10 (for example, vehicle system modules such as, but not limited to, the BCM 24). CGM 36 may moreover have the capability to both read and write messages from the vehicle's CAN 19 as well as be able to stop messages from being written to CAN 19 when required. CGM 36 may moreover write messages based on requests from remote entity 14. CGM 36 may log all successful connections and connection attempts for the NAD 32 and SRWC module 16 as a read-only message which is stored in memory device 37 and such read-only messages may be requested by and sent to remote entity 14. CGM 36 may also include an independent microprocessor with a CAN bus interface to provide the software firewall gateway so as to limit message writing activity of the vehicle's CAN bus 19.

The CMS 38 encrypts the messages written via CGM 36 before being established across CAN 19 as well as securely store these messages in memory 37. The encryptions generated by CMS 38 may be tamperproof and include hashing or signing to accomplish such an effect. As follows, CMS 38 adds a layer of security that goes beyond the software firewall generated by CGM 36. For example, if one or more hackers successfully access communications across the CAN, the accessory module-generated information would be encrypted and likely unreadable.

In certain embodiments, accessory module 16 may include an external interface module (EIM) 39 to allow the accessory module 16 to communicate with one or more external vehicle systems (e.g., aftermarket systems). For example, EIM 39 enables accessory module 16 to be connected to, and in communication with, an aftermarket vehicle entertainment system (e.g., a headrest display screen) to enable accessory module 16 to display messages at various points during the vehicle's operation.

In certain embodiments, accessory module 16 may further include the passive entry/passive start (PEPS) module 21 which provides passive detection of the absence or presence of a passive physical vehicle key or a virtual vehicle key. When the passive physical key approaches, PEPS module 21 can determine if the passive physical key is authentic as belonging to vehicle 10. The PEPS module 21 can likewise use authentication information received from remote entity 14 to determine if a virtual key is authorized/authentic to vehicle 10. If the virtual vehicle key is deemed authentic, the PEPS can send communications to CNG module 26 to enable the accessory module to know when to permit vehicle access (i.e., enabling accessory module 16 to act as a key fob). It should be understood that alternative embodiments of the system include PEPS module 21 being located outside of accessory module 16 (i.e., elsewhere within vehicle 10).

The vehicle 10 further includes a body control module (BCM) 24 that monitors and governs various electrical components located throughout the vehicle body, for example, the vehicle's power door locks, air conditioner, engine ignition, vehicle seat adjustment and heating, mirrors, and headlights. As follows, the BCM 24 includes various vehicle functionality including, but not limited to, door lock and unlock, trunk or tailgate release, sound horn, remote start, and engine start/stop.

In one non-limiting example, to obtain authorization, the remote entity 14 issues an encrypted public key 27 to the mobile computing device 12 over wireless carrier system 11. As such, when the user approaches the vehicle 10 the mobile computing device 12 transmits public key 27 to accessory module 16 for validation. In this embodiment, public key 27 includes a two layered token of encapsulated information. An outer token layer is the "command request" (e.g., lock, unlock, etc.) and is signed by the mobile computing device's public key. An inner token layer is the "digital key" and includes a unmodified server-signed object, which can provide a clear text package of the allowed operations, constraints (allowed time frames etc.), and the mobile computing device's public certificate\key and other server information. The authorization key which has been previously installed onto the accessory module can be used so that this token package can be validated. As such, accessory module 16 and mobile computing device 12 can authenticate one another for vehicle access and operation.

In an alternative non-limiting example, to obtain authorization, via wireless carrier system 11, the remote entity 14 issues and transmits encrypted public key 27 to mobile computing device and issues and transmits encrypted public key 29 to accessory module 16. When the user approaches the vehicle 10, mobile computing device 12 transmits public key 27 to the accessory module 16 to be validated as originating from both the remote entity and device 12. The public key 29 can then be used to validate public key 27 to determine that each key has originated from the true party. It should be understood that these validation schemes are known in the art and that alternative validation schemes may be utilized within this system.

The CAN 19 is a vehicle bus standard that allows accessory module 16 (i.e., PEPS 21) to be indirectly coupled to the BCM 24 and other vehicle system modules (VSMs) (not shown). As discussed above, the PEPS 21 and BCM 24 are enabled work in collaboration to lock and unlock vehicle doors (including a trunk or tailgate release), start-up and turn off an engine, and other vehicle functions typically controlled by a key fob. As a result, a fob typically carried by the user is not required for passive vehicle operation and engine start, and that any person may be provided access to the shared vehicle through a registration and authorization process that utilizes their mobile computing device 12.

Figure 3:
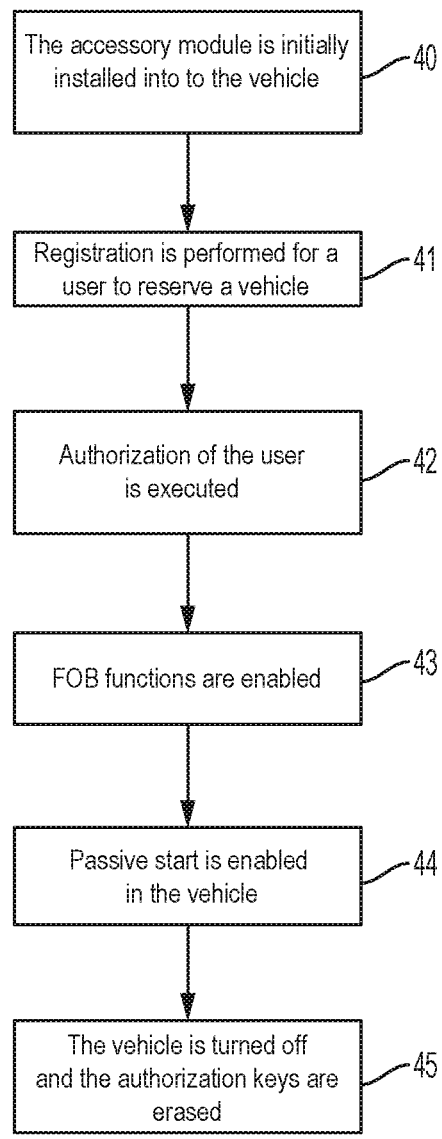
FIG. 3 is a broad overview flowchart for reserving and authorizing use of the vehicle.

FIG. 3 is a broad overview of the process for reserving and authorizing use of the vehicle equipped for vehicle sharing.

In step 40, accessory module 16 is initially installed into to the vehicle 10, as discussed above. The accessory module 16 includes a remote keyless component that can be used to perform vehicle access and start functions (i.e., via PEPS module 21).

In step 41, registration is performed for a user to reserve a vehicle utilizing a CarShare App installed onto the mobile computing device 12. The mobile computing device 12 may create a registration for a respective vehicle by having various details provided such as, but not limited to, device identification, user name, and reservation details.

In step 42, authorization of the user is executed between mobile computing device 12 and accessory module 16.

In step 43, upon a successful authorization, FOB functions such as, but not limited to, lock, unlock, and passive start/stop are enabled, based on requests from the mobile computing device 12.

In step 44, passive start is enabled in the vehicle upon the user actuating a push start/stop button via the CarShare App on mobile computing device 12. Remote start may be performed when the user is in proximity of the vehicle 10 (e.g., within 10 feet).

In step 45, upon completion of the reservation, the engine of vehicle 10 is turned off and the authorization keys are erased so that the vehicle 10 cannot be operated until entirely new authorization keys are issued.

Figure 4:
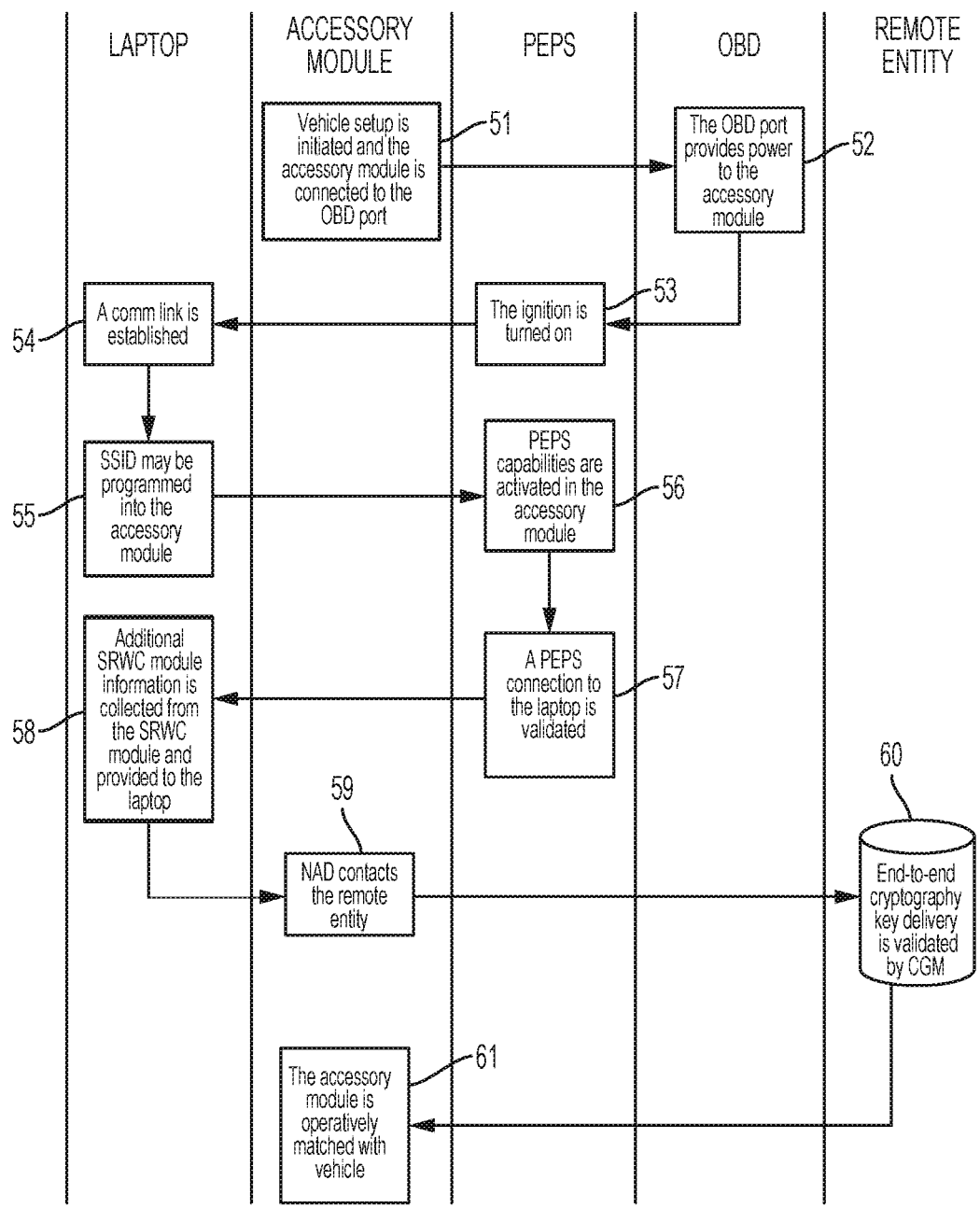
FIG. 4 is a flow diagram for initial setup of an accessory module.

FIG. 4 represents a flow diagram for an initial setup of the accessory module 16, as described earlier in step 40. Upon installing the accessory module 16 in the vehicle, accessory module 16 must be paired with the vehicle 10 as an additional remote keyless device. In step 51, the vehicle setup is initiated and the accessory module 16 is connected to the OBD port, Assembly Line Diagnostic link (ALDL), CAN 19, or similar.

In step 52, the OBD 30 provides power to the accessory module 16 via CAN 19. In step 53, ignition is turned on.

In step 54, the accessory module 16 utilizes communications provided by communications module 18 and a communication link is coupled to a computing device such as, for example, a laptop and short-range wireless communications between the accessory module 16 and laptop are established.

In step 55, a wireless service identifier (SSID) may be programmed into the accessory module 16 to provide it with long-range network access via the NAD 32. The SSID is a sequence of characters that uniquely name and establish accessory module 16 to conduct communications over wireless carrier system 11. In this step, laptop may also test GPS module 34 to ensure proper location signals can be communicated to GNSS.

In step 56, PEPS capabilities are activated in the accessory module 16. For example, CNG module 26 is hardwired to the PEPS module 21 and vehicle CAN bus 19. In this step, the accessory module 16 becomes an additional fob to the vehicle.

In step 57, a PEPS connection to the laptop is validated. This step validates that the fob was successfully paired and is functional. In step 58, additional SRWC module information such as the SRWC node ID is collected from the SRWC module 18 and is provided to the laptop for fleet management purposes.

In step 59, NAD 32 contacts the remote entity 14 through wireless carrier system 11 to provide keys to perform cryptography validation by remotely transmitting the validation keys to accessory module 16. Once received by NAD 32, the CGM 36 and CMS 38 collaborate to perform the cryptography validation process.

In step 60, end-to-end cryptography key delivery from the remote entity to the accessory module 16 is validated by CGM 36. As a result, in step 61, the accessory module 16 (i.e., CNG module 26) is operatively matched with vehicle 10 and can implement PEPS module 21 functionality for ongoing communication between the respective devices of the vehicle. The CGM 36 logs the connection and the connection is stored on memory device 37.

Figure 5:
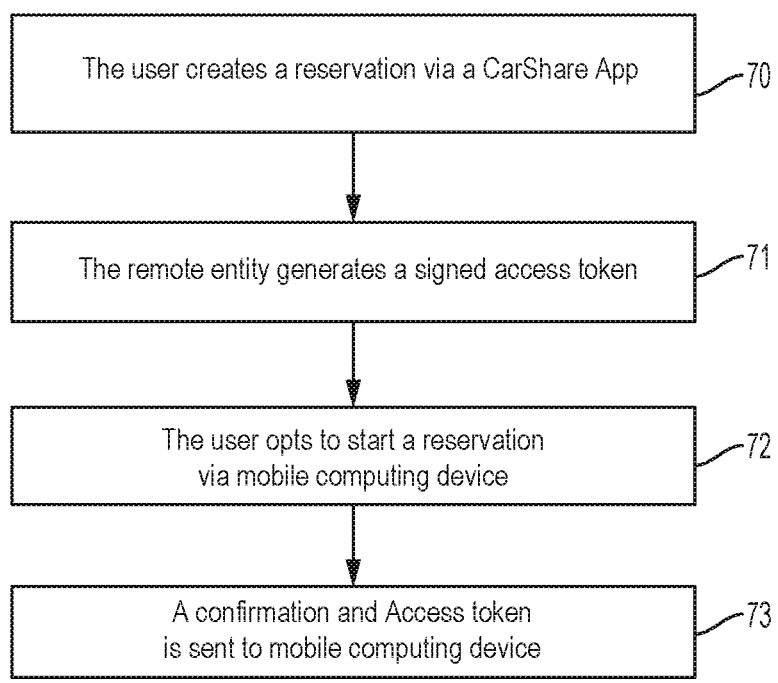
FIG. 5 is a flow diagram for reservation of a vehicle.

FIG. 5 represents a flow diagram for a reservation that utilizes mobile computing device 12, as described earlier in step 41.

In step 70, the user utilizing a CarShare App creates a reservation. The registration includes information such as, but is not limited to, a computing device ID (e.g., smart phone identifier), username, and reservation details.

In step 71, the remote entity 10 generates a signed access token for the registration. The access token is transmitted to both the mobile computing device 12 and accessory module 16 (via NAD 32) within a predetermined period of time from the registration request. The signed access token may include a SRWC universal unique identifier (UUID), time range, and timestamp.

In step 72, the user opts to start a reservation via mobile computing device 12.

In step 73, a confirmation and Access token is sent to mobile computing device 12 and the confirmation may be sent to the user via the CarShare App.

Figure 6:
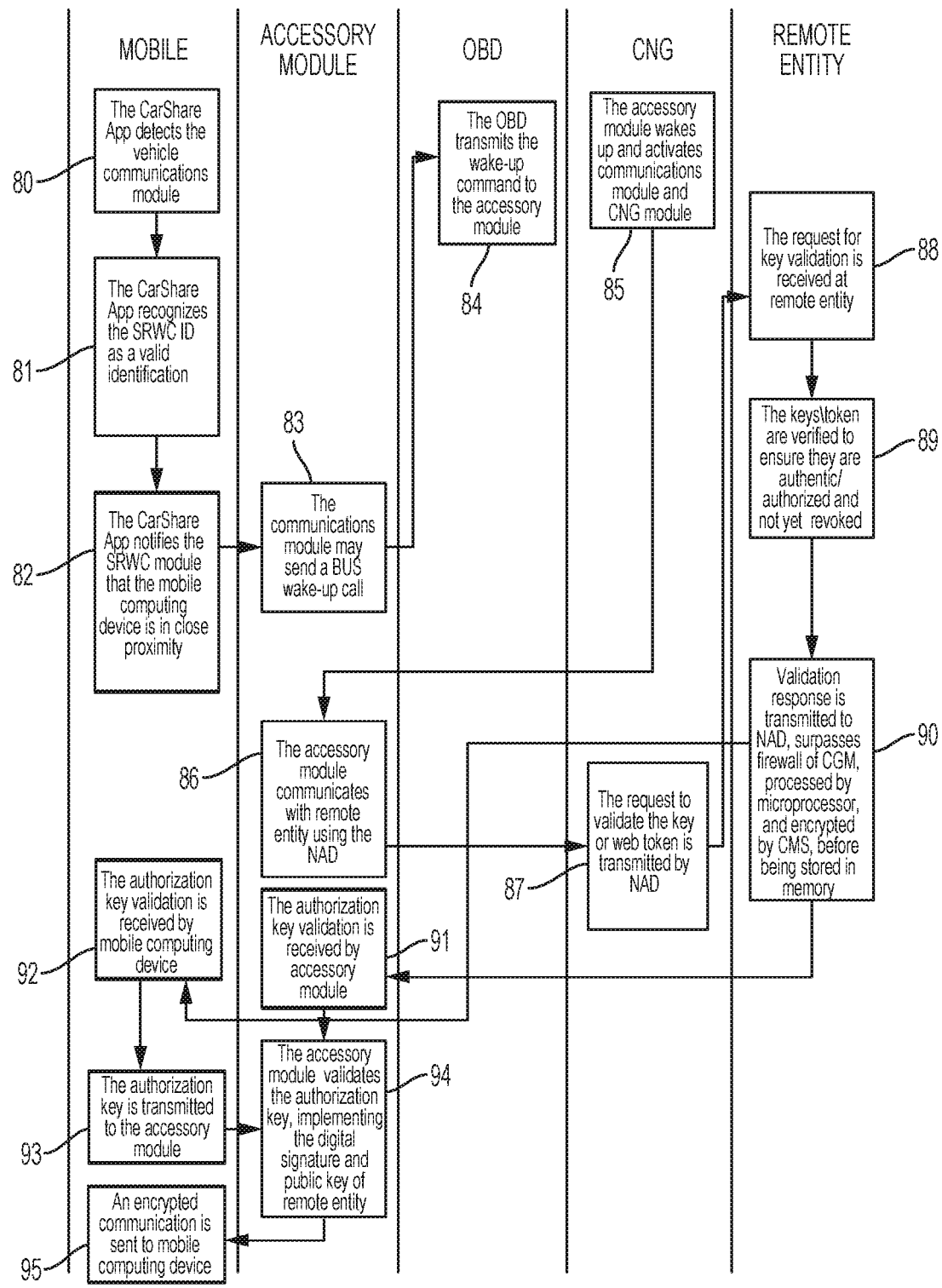
FIG. 6 is a flow diagram for detection and authorization of a user based on an approaching mobile computing device.

FIG. 6 represents one non-limiting example of detection and authorization of an approaching mobile computing device 12. In step 80, in response to an input request or a driver approaching the vehicle 10 with the registered mobile computing device 12, the CarShare App detects the vehicle communications module 18 through a SRWC broadcast signal (interrogation signal). As such, SRWC module 18 periodically wakes up and broadcasts a challenge signal for listening devices. In this step, GPS module 26 may receive position information and communicate with NAD 32 to provide position information to remote entity 11, which may or may not be based upon a request. Remote entity 11 may in turn provide the vehicle position to mobile computing device 12.

In step 81, the CarShare App recognizes the received SRWC ID as a valid identification for vehicle 10. As a result, the CarShare App pairs mobile computing device 12 to accessory module 16.

In step 82, the CarShare App notifies the SRWC module 18 that the mobile computing device 12 is in close proximity to the vehicle.

In step 83, in response to the application notifying the SRWC module 18 as to the proximity of the mobile computing device 12, the communications module 18 may send a BUS wake-up call to the components on the vehicle CAN such as, for example OBD 30 and PEPS 21. In step 84, the OBD 30 transmits the wake-up command to the accessory module 16.

In step 85, the accessory module 16 wakes up and activates communications module 18 as well as the CNG module 26 and corresponding subcomponents.

In step 86, the accessory module 16 communicates with remote entity 14 using the NAD 32. A request to ensure that the token has not been revoked is transmitted from the NAD 32 via wireless carrier system 11 to the remote entity 14. In optional step 87, the request to validate the key or web token is transmitted by NAD 32 (i.e., CNG module 26) via wireless carrier system 11.

In step 88, the request for key validation is received at remote entity 14. The keys\token are verified to ensure that they are authentic/authorized and have not yet been revoked by remote entity 11 (step 89).

In step 90, validation response is transmitted to the NAD 32, surpasses the firewall of CGM 36, processed by microprocessor 37, and encrypted by CMS 38 before being stored in memory 37.

In step 91, the authorization key validation is received by accessory module 16 (i.e., received by NAD 32, surpasses the firewall of CGM 36, processed by microprocessor 37, and encrypted by CMS 38 before being stored in memory 37). In addition, in step 92, the authorization key validation is received by mobile computing device 12.

In step 93, the authorization key received by the mobile computing device 12 is transmitted to the accessory module 16 via the SRWC module 18.

In step 94, the accessory module 16 validates the authorization key received by mobile computing device 12 implementing the digital signature and the public key of the remote entity 14. For example, the authorization key is screened by CGM 36 and processed by microprocessor 37 before it may be encrypted by CMS 38.

In step 95, an encrypted communication is sent to mobile computing device 12 to finalize the authorized communications between mobile computing device 12 and accessory module 16.

Figure 7:
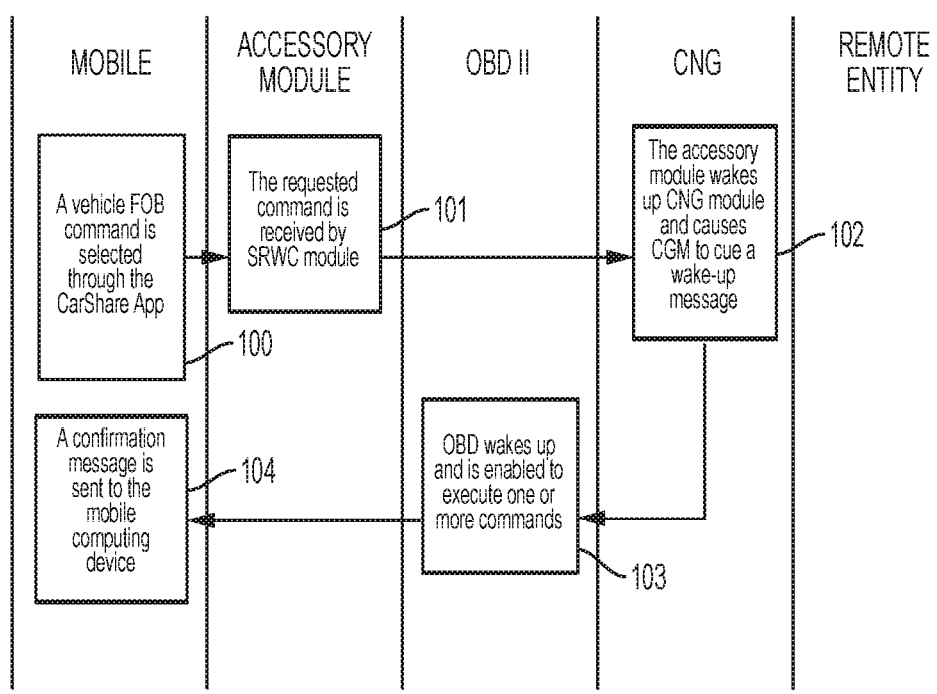
FIG. 7 is a flow diagram for executing vehicle functions via the mobile computing device.

FIG. 7 is a flow diagram for executing vehicle functions typically executed by a vehicle key FOB, as discussed earlier in step 43. The following steps recite short range communication between the mobile computing device 12 and vehicle 10.

In step 100, a vehicle FOB command (e.g., lock, unlock, remote start) is selected through the CarShare App, of mobile computing device 12, by a user.

In step 101, the requested command is transmitted wirelessly and received by the SRWC module 18.

In step 102, the accessory module 16 wakes up CNG module 26 and causes CGM 36 to cue a wake-up message that is transmitted on the communication bus (i.e., a direct form of communication). In this step, CNG module 26 writes a wake-up command on the CAN bus 19 that enables OBD 30 to execute the commands such as lock, unlock, sound horn, and remote start. In this step, GPS module 34 may receive position information and communicate with NAD 32 to provide that position information to remote entity 11. In step 103, OBD 30 wakes up and is enabled to execute such commands.

In step 104, a confirmation message is sent to the mobile computing device 12, and received via the CarShare App, indicating that the request has been executed.

Figure 8:
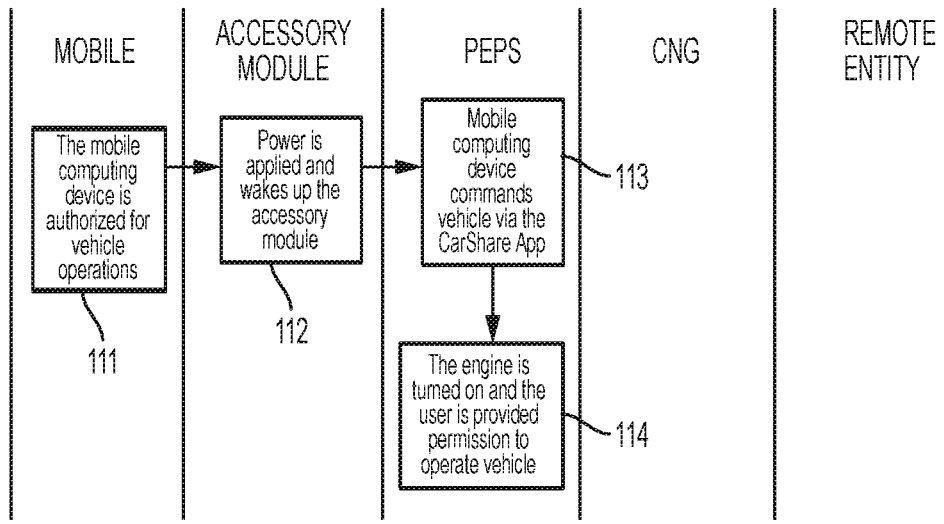
FIG. 8 is a flow diagram for executing driving functions of the vehicle.

FIG. 8 is a flow diagram for executing driving functions of vehicle 10 based on an authentication between the accessory module 16 and the mobile computing device 12.

In step 111, the mobile computing device 12 (i.e., CarShare App) is authorized for vehicle operations. Once the user is within the interior of the vehicle, SRWC module 18 detects mobile computing device 12 is within the interior of the vehicle 10.

In step 112, power is applied and wakes up the accessory module 16. Power may also be supplied through the OBD 30 or the CAN 19. In step 113, a user of mobile computing device 12 commands vehicle operations through the CarShare App. PEPS module 21 functionality is executed by authorizing engine access as would be performed during a typical PEPS operation. In step 114, the engine is turned on and the user is provided permission to operate vehicle 10.

Figure 9:
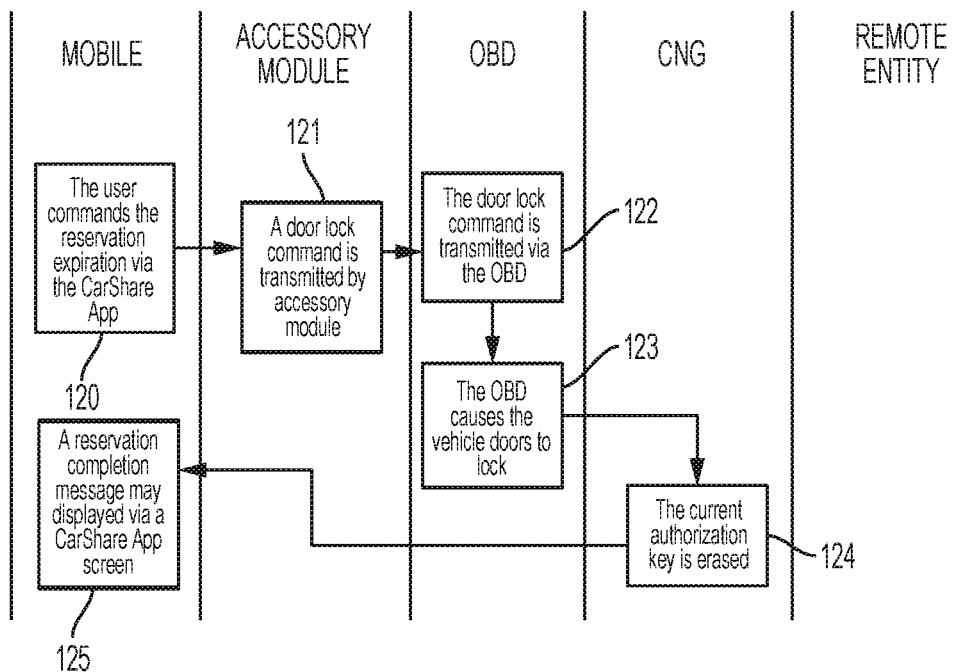
FIG. 9 is a flow diagram for securing the vehicle upon a completed trip.

FIG. 9 represents a flowchart for securing the vehicle after the mobile device user exits the vehicle.

In step 120, in response to the completion of a vehicle-share reservation, the user may command the reservation expiration (end) via the CarShare App or the reservation may naturally expire at the designated reservation end time. Otherwise, in this step, the system may sense that the communication link between SRWC module 18 and mobile computing device 12 has been severed, and thus an assumption is made that the mobile computing device has moved beyond the wireless range. This may trigger the following steps of preventative measures, for example, to prevent vehicle theft or misuse.

In step 121, a door lock command is transmitted by accessory module 16 (i.e., via CGM 36) to request a door lock command. In step 122, the door lock command is transmitted via the OBD 30.

In step 123, the OBD 30 causes the vehicle doors to lock.

In step 124, in response to the door lock command being transmitted by the accessory module 16, the current authorization key is erased from the memory 37 by CNG module 26 (e.g., via CGM 36 and CMS 38). In this step, GPS module 34 may receive position information and communicate with NAD 32 to provide that position information to remote entity 11.

In step 125, SRWC module 18 may communicate with mobile computing device 12 and a reservation completion message may displayed on the device (via a CarShare App screen and/or vehicle display screen).

Figure 10:
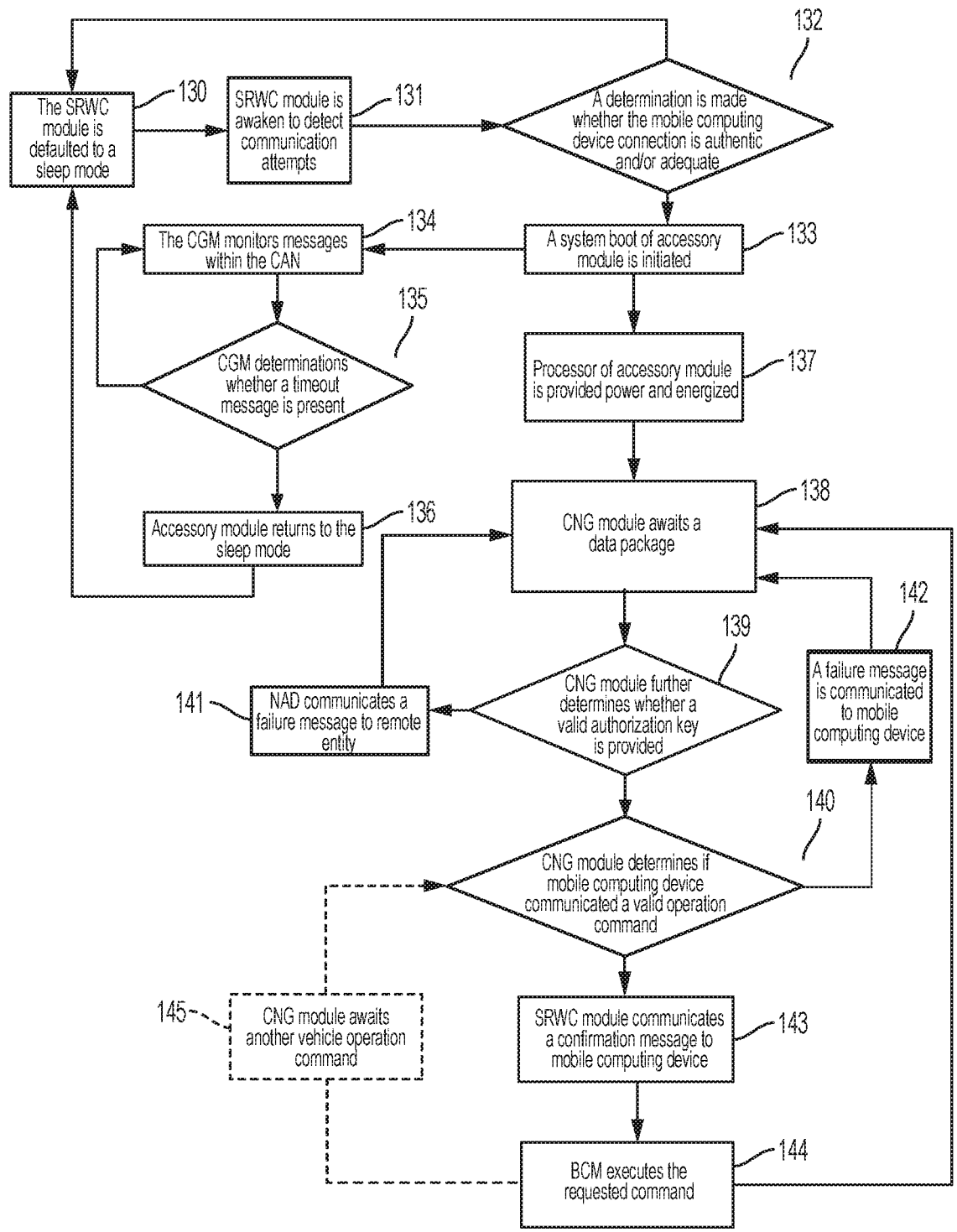
FIG. 10 is a flowchart for executing vehicle command functionality between the mobile computing device and the accessory module.

FIG. 10 is a flowchart of executable instructions/code segment for executing vehicle command functionality between the mobile computing device 12 and the accessory module 16.

In block 130, the SRWC module 18 is defaulted to a sleep mode. During this sleep mode, the SRWC module 18 conserves power such that communication signals are neither broadcasted nor received.

In block 131, SRWC module 18 is awaken to detect the communication attempts of a mobile computing device 12 located in proximity of vehicle 10.

In block 132, a determination is made whether mobile computing device 12 connection is authentic and/or adequate. As follows, the firewall of CGM 36 screens the information in the communication for authenticity. If the CGM determination is made that the connection attempt of mobile computing device 12 is not authentic and/or adequate, then the CGM 36 logs the connection attempt, and the routine returns to step 130 where the SRWC module 18 returns to the sleep mode. In the alternative, if the CGM determination is made that the connection attempt is authentic and/or adequate, then routine proceeds to step 133.

In step 133, a system boot of accessory module 16 is initiated and power is allocated to antenna system 20 so that SRWC module 18 may conduct the communications between mobile computing device 12 and accessory module 20.

As shown in the flowchart, two respective paths are required to be taken after step 133. First, the flow path is directed to step 134 where the CGM 36 monitors messages within the CAN. In step 135, CGM 36 determinations whether a timeout message is present over the CAN 19. As follows, CGM 36 writes a timeout when no communications are currently present on the CAN 19 after a predetermined amount of time. If the determination is made that no communication is present, then the routine moves to step 136 to perform a system shutdown, and accessory module 16 (and SRWC module 18) returns to the sleep mode. In the alternative, if CGM 36 determines that communications are present, then processor 37 causes the routine to continuously loop between step 134 and 135, so as to cause communications to be verified on an ongoing basis.

Second, the flow path proceeds to step 137. In step 137, processor 37 of accessory module 16 is provided power and energized (and optionally CGM 36 communicates a wakeup command to BCM 24 via vehicle CAN bus 19). In this step, NAD 32 may also communicate authentication key requests to remote entity 14 via antenna system 20. In response, remote entity 14 may communicate the authentication keys to both mobile computing device 12 and NAD 32. GPS module 34 may also receive position information and communicate with NAD 32 to provide that position information to remote entity 14 via wireless carrier system 11. Skilled artisans will understand that these authentication keys may have a JSON Web Token format.

In step 138, CNG module 26 awaits a data package, having its unique authentication key, to be provided by remote entity 14 via a wireless carrier system 11. It is understood this authentication key data package is received by NAD 32. Once received, the contents of the package (i.e., the authentication key) are screened by the firewall generated by CGM 36. As a result, if the data package does not include a unique identifier previously programmed into CNG 36 (or processor 37), the data package will be rejected by the firewall before being unpacked. The flow may be considered complete at this point. A failure message may also be communicated by CNG module 26 (transmitted via NAD 32) over to remote entity 14, and which may include instructions explaining why the data package has been rejected.

In step 139, CNG module 26 further determines whether a valid authorization key is provided by remote entity 14. If CNG module 26 determines that a valid authorization key is provided, then the routine proceeds to step 140; otherwise, routine proceeds to step 141. In step 141, NAD 32 communicates a failure message to remote entity 14 and the flow returns to step 138, to await to screen the next package being transmitted by remote entity 14.

In step 140, once paired, CNG module 26 determines whether mobile computing device 12 has communicated a valid vehicle operation command. If accessory module 16 determines that the vehicle operation command is valid, the routine proceeds to step 142; otherwise, the routine proceeds to step 143. In step 142, a failure message is communicated to mobile computing device 12.

In step 143, SRWC module 18 communicates a confirmation message to mobile computing device 12. This message may state that the request has been successfully communicated, received, and authorized. Correspondingly, accessory module 16 communicates that BCM 24 functions accordingly. In this step, CGM 36 and CMS 38 may also log the successful communication link to memory 37.

In step 144, the BCM 24 executes the requested command (e.g., lock door, unlock door, horn, release trunk). The flow may be considered complete at this point. Alternatively, optionally, the flow may move to step 145 where CNG module 26 awaits another vehicle operation command. Upon receipt of the operation command, the flow will return to step 140.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for."

What is claimed is:

1. A method of authorizing temporary access and operation of a vehicle via a mobile computing device, the method comprises:
   generating a reservation request to reserve the vehicle via the mobile computing device;
   communicating the reservation request to a remote entity;
   in response to a successful reservation request, via the remote entity, transmitting an authentication key to the mobile computing device over a wireless carrier system, wherein an accessory module is used to perform vehicle access and vehicle operations of the vehicle, wherein the accessory module comprises a CNG module that includes a Network Access Device (NAD), GPS module, Cybersecurity Gateway Module (CGM), and Cryptographic Module (CMS), and wherein the authentication key enable the mobile computing device and the accessory module to be paired for vehicle access and operations;
   executing an authorization between the mobile computing device and the accessory module; and
   enabling access to vehicle operations in response to a successful authorization;
   wherein generating the reservation request to reserve the vehicle via the mobile computing device further comprises the steps of:
      communicating the reservation request to a remote entity by the mobile computing device;
      generating a signed access token by the remote entity; and
      transmitting the signed access token to the NAD of the accessory module within a predetermined time from the reservation request.

2. The method of claim 1 wherein the accessory module is enabled to perform vehicle access and vehicle operations through the steps of:
   providing communications between the CNG module and a passive entry/passive start (PEPS) module;
   requesting cryptography keys from a remote entity, via the NAD, for validation between the CNG module and the PEPS module; and
   validating the cryptography keys via the CGM.

3. The method of claim 1 further comprising the step of sending a confirmation to the mobile computing device.

4. The method of claim 1 wherein the step of executing an authorization between the mobile computing device and the accessory module further comprises the steps of:
   receiving, by the mobile computing device, a broadcast short range wireless communications signal transmitted by a communications module of the accessory module;
   pairing the mobile computing device and the communications module; and
   validating the mobile computing device to the accessory module utilizing an authorization key validation technique.

5. The method of claim 4 wherein the communications module utilizes a Bluetooth low energy (BLE) protocol.

6. The method of claim 5 wherein receiving, by the mobile computing device, the broadcast short range wireless communications signal transmitted by the communications module further comprises the steps of:
   monitoring a communication bus for one or more communications over a predetermined period of time;
   transmitting a wake-up call to the CNG module in response to the one or more communications on the communication bus during the predetermined period of time; otherwise,
   entering sleep mode.

7. The method of claim 1 wherein enabling access to the vehicle and vehicle operations in response to a successful authorization further comprises the steps of:
   actuating a command on the mobile computing device relating to a vehicle operation;
   transmitting the command from the mobile computing device to a communications module over a short-range wireless communication protocol;
   receiving the command by the communications module and communicating the command to the accessory module;
   transmitting, by the accessory module, the command to a passive entry/passive start (PEPS) module; and
   actuating, via the PEPS module, a selected vehicle function in response to receiving the command.

8. The method of claim 7 wherein the step of transmitting the command to the PEPS module comprises:
   transmitting, by the accessory module, a wake-up call to the (PEPS) module; and
   transmitting the command to the (PEPS) module.

9. The method of claim 1 wherein enabling access to the vehicle and vehicle operations in response to a successful authorization further comprises the steps of:
   detecting the mobile computing device within an interior of the vehicle, via a communications module, in response to actuating a vehicle function;
   supplying power to the accessory module, wherein the accessory module stores at least one authentication key for enabling vehicle start functions;
   detecting an actuation of a switch for ignition activation within the vehicle; and
   enabling an engine start operation of the vehicle.

10. The method of claim 1 further comprising the steps of:
    detecting at least one of an end of trip selection by a user or a timed out period;
    transmitting, by the accessory module, a door lock command to a passive entry/passive start (PEPS) module;
    actuating a vehicle door lock operation; and
    deleting the authentication key from a memory of the accessory module.

11. The method of claim 1 further comprising an external interface module (EIM) configured to communicate with one or more external vehicle systems.

12. The method of claim 1 wherein the method is carried out by a processor coupled to an antenna system, the antenna system configured to enable the processor to communicate with one or more remote computing devices.

13. The method of claim 1 wherein the method is carried out by a processor packaged in a tamperproof and potted enclosure being secured within a vehicle.

14. The method of claim 1 wherein the mobile computing device is a smart phone, cell phone, or tablet.

15. A system to authorize temporary access and operation of a vehicle via a mobile computing device, the system comprises:
    a memory configured to comprise a plurality of executable instructions and a processor configured to execute the executable instructions, wherein the executable instructions enable the processor to:
    generate a reservation request to reserve the vehicle via the mobile computing device;
    communicate the reservation request to a remote entity;
    in response to a successful reservation request, via the remote entity, transmit an authentication key to the mobile computing device over a wireless carrier system, wherein an accessory module is used to perform vehicle access and vehicle operations of the vehicle, wherein the accessory module comprises a CNG module that includes a Network Access Device (NAD), GPS module, Cybersecurity Gateway Module (CGM), and Cryptographic Module (CMS), and wherein the authentication key enable the mobile computing device and the accessory module to be paired for vehicle access and operations;

execute an authorization between the mobile computing device and the accessory module; and enable access to vehicle operations in response to a successful authorization;

wherein generate the reservation request to reserve the vehicle via the mobile computing device further comprises:

communicate the reservation request to a remote entity by the mobile computing device;

generate a signed access token by the remote entity; and transmit the signed access token to the NAD of the accessory module within a predetermined time from the reservation request.

16. A non-transitory machine-readable medium having stored thereon executable instructions configured to authorize temporary access and operation of a vehicle via a mobile computing device, which when provided to a processor and executed thereby, causes the processor to:

generate a reservation request to reserve the vehicle via the mobile computing device;

communicate the reservation request to a remote entity;

in response to a successful reservation request, via the remote entity, transmit an authentication key to the mobile computing device over a wireless carrier system, wherein an accessory module is used to perform vehicle access and vehicle operations of the vehicle, wherein the accessory module comprises a CNG module that includes a Network Access Device (NAD), GPS module, Cybersecurity Gateway Module (CGM), and Cryptographic Module (CMS), and wherein the authentication key enable the mobile computing device and the accessory module to be paired for vehicle access and operations;

execute an authorization between the mobile computing device and the accessory module; and enable access to vehicle operations in response to a successful authorization;

wherein generate the reservation request to reserve the vehicle via the mobile computing device further comprises:

communicate the reservation request to a remote entity by the mobile computing device;

generate a signed access token by the remote entity; and transmit the signed access token to the NAD of the accessory module within a predetermined time from the reservation request.

17. The method of claim 1 further comprising remotely tracking, monitoring, or controlling the vehicle via the accessory module.

* * * * *